United States Patent
Morkel

(10) Patent No.: US 6,476,953 B1
(45) Date of Patent: *Nov. 5, 2002

(54) WAVELENGTH PRESERVING REGENERATOR FOR DWDM TRANSMISSION SYSTEMS

(75) Inventor: Paul R. Morkel, Allen, TX (US)

(73) Assignee: Fujitsu Network Communications, Inc., Richardson, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,017

(22) Filed: Aug. 18, 1999

(51) Int. Cl.[7] .............................................. H04B 10/02
(52) U.S. Cl. ...................................... 359/176; 359/158
(58) Field of Search ................................ 359/176, 174, 359/124, 158

(56) References Cited

U.S. PATENT DOCUMENTS

| | | | |
|---|---|---|---|
| 4,313,224 A | * 1/1982 | Wakabayashi et al. | 359/177 |
| 5,107,483 A | 4/1992 | Nakajima et al. | 369/108 |
| 5,410,624 A | 4/1995 | Morkel | 385/24 |
| 5,483,372 A | 1/1996 | Green, Jr. | 359/173 |
| 5,532,863 A | 7/1996 | Liedenbaum et al. | 359/176 |
| 5,539,557 A | 7/1996 | Horiuchi et al. | 359/110 |
| 5,576,883 A | 11/1996 | Morkel et al. | 359/494 |
| 5,689,594 A | 11/1997 | Mao | 385/24 |
| 5,777,766 A | 7/1998 | Fontana et al. | 359/158 |
| 5,801,862 A | 9/1998 | Desurvire et al. | 359/124 |
| 5,838,475 A | 11/1998 | Takeyari et al. | 359/176 |

FOREIGN PATENT DOCUMENTS

| | | | | |
|---|---|---|---|---|
| EP | 0421449 A2 | 5/1990 | | H04B/10/16 |
| EP | 0732786 A1 | 12/1996 | | H01S/3/25 |
| EP | 0841768 A2 | 5/1997 | | H04L/7/00 |
| EP | 0975105 A2 | 12/1999 | | H04B/10/16 |
| WO | WO99/39483 | 5/1997 | | H04L/25/24 |

* cited by examiner

*Primary Examiner*—Knife-Michael Negash
(74) *Attorney, Agent, or Firm*—Baker Botts L.L.P.

(57) ABSTRACT

An optical system includes a number of substantially identical, tunable, wavelength-preserving, optical regenerators 10. Each of the regenerators 10 is tuned to a different wavelength so that when a regenerator 10 is tuned to a given wavelength that regenerator will generate a regenerated, reshaped and retimed optical signal at the same given wavelength. The system also includes a multiplexer 32 coupled to receive and combine regenerated optical signal from each of regenerators. A filtering system (34) is provided, either internal or external to regenerators 10, to demultiplex different wavelength signals from an aggregate WDM optical signal.

24 Claims, 2 Drawing Sheets

WAVELENGTH PRESERVING REGENERATOR FOR DWDM TRANSMISSION SYSTEMS

FIELD OF THE INVENTION

This invention relates generally to optical devices and specifically to a wavelength preserving regenerator for DWDM transmission systems.

BACKGROUND OF THE INVENTION

Optical communication systems are prevalent in many networks. For example, optical fibers can be used for voice networks, data networks as well as hybrid networks (e.g., networks that carry voice, data, video and possibly other types of information). These systems are especially useful to transport information over long distances.

There is, however, a limit as to the distance a light signal may travel. To increase this distance, optical amplifiers may be used. Optical amplifiers are advantageous in that they boost the optical amplitude of a signal. Unfortunately, optical amplifiers also create and amplify optical noise (termed Amplified Spontaneous Emission noise) and do not overcome transmission impairments such as chromatic and polarization mode dispersion. All of these impairments eventually leads to errors in the detection of signals after propagation and amplification over long distances.

As a result, digital systems also include regenerators. A regenerator reconstructs the original digital pulse signals in shape and timing rather than simply amplifying that signal without regard for reshaping or retiming. A regenerator is thus typically termed a 3R device (Regeneration, Reshaping and Retiming) whereas an optical amplifier is termed a 1R device. For example, in an optical communications system, the regenerator would detect an optical signal and convert that optical signal to an electrical signal. The state (e.g., logical "0" or logical "1" for a binary signal) is then determined and a new optical signal is generated. Since the new signal has been regenerated, it will be identical to the original signal, assuming that an error has not been introduced (i.e., a logical "0" was interpreted as a logical "1", or vice versa).

SUMMARY OF THE INVENTION

In one aspect, the present invention provides an improved optical regenerator and systems that can use such a regenerator. One such optical system includes a number of substantially identical, tunable, wavelength-preserving, optical regenerators. Each of the regenerators is tuned to a different wavelength so that when a regenerator is tuned to a given wavelength that regenerator will generate a regenerated, reshaped and retimed optical signal at the same given wavelength. The system also includes a multiplexer coupled to receive and combine regenerated optical signal from each of regenerators.

In the preferred embodiment, the wavelength preserving optical regenerator includes an optical-to-electrical (O/E) conversion unit. This unit will receive an optical signal at a first wavelength. The optical signal has been demultiplexed from a WDM optical signal, possibly by a tunable optical filter. The filtering function may be integrated with the regenerator or external to it. A retiming and regeneration circuit, e.g., a D-type flip/flop and a clock circuit, receives a signal from the O/E unit and provides a regenerated electrical signal to an electrical-to-optical conversion (E/O) unit. The E/O unit generates an optical signal based on the electrical signal. In this embodiment in particular, the E/O unit includes a tunable laser that is tuned so that the wavelength of the optical signal generated by the electrical-to-optical conversion unit has a fixed relationship with (e.g., is equal to) the first wavelength.

In one embodiment, the regenerator includes an optical monitor. The optical monitor takes optical signals from the input of the O/E unit and the output of the E/O unit and compares the wavelengths. Based on this comparison, the optical monitor generates a control signal that is used to tune the wavelength of the optical signal generated by the E/O unit. For example, the output wavelength can be locked onto the input wavelength. This embodiment is useful because the E/O unit is self-tuning, which simplifies installation and maintenance.

The present invention has a number of advantages. For example, the optical regenerators are simple and provide convenient use for WDM systems. The invention provides a useful way to separate out wavelengths, identify and regenerate a pulse stream, and recombine the different channels. In one embodiment, an optical regeneration system can utilize a number of identical regenerators for different wavelength channels. Using a single design of regenerators reduces costs because manufacturing must be adjusted for different designs. Maintenance costs are also reduced because fewer replacement devices need to be kept on hand.

BRIEF DESCRIPTION OF THE DRAWINGS

The above features of the present invention will be more clearly understood from consideration of the following descriptions in connection with accompanying drawings in which.

DESCRIPTION OF ILLUSTRATIVE EMBODIMENTS

Figure 1:
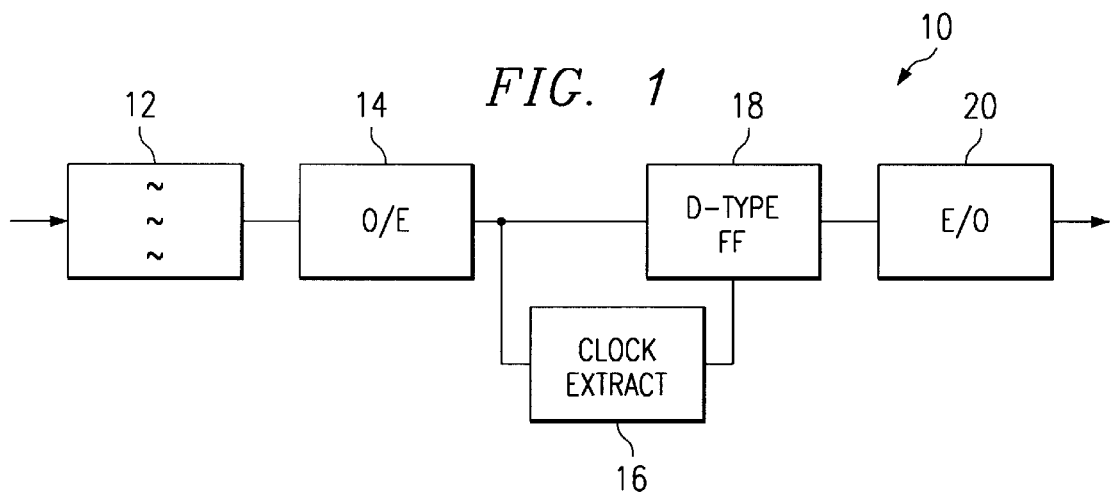
FIG. 1 is a first embodiment optical regenerator.

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

The present invention will be described in the context of dense wavelength division multiplexed (DWDM) transmission systems. With this technology, signals are carried over a range of wavelengths, preferably assigned one signal per wavelength. In other cases within the scope of the present invention, the signals could further be time division multiplexed so that different signals utilize the same wavelength but at different times. With the increasing deployment of DWDM in the core transport network, all optical processing functions will play an increasing role for routing and control of signals. Currently, DWDM systems with up to 80 wavelength channels are commercially available and in the future channel counts in excess of 200 on a single fiber may be expected.

One of the components of an all-optical communications system is an optical add-drop multiplexer (OADM). An OADM is a device that can add or drop (i.e., combine or remove) signals at a particular wavelength from an aggregate light wave that includes different signals at different wavelengths. OADM equipment based on spectral filtering of the DWDM aggregate is expected to be commercially deployed shortly for termination of a fraction of the channels from the total DWDM capacity. Those channels that are terminated can be converted to electrical signals while the remaining channels are forwarded optically, without being converted to electrical signals. The advantage of partial termination is that the resulting equipment may be smaller and lower cost while still providing all the required functionality.

It has also been proposed that the OADM will evolve to provide all-optical protection switching functionality offering many of the advantages of SONET ADM (synchronous optical network add-drop multiplexing) equipment. Unlike SONET, however, the all-optical protection switching facility operates in the optical or photonic layer of the network. One such protection facility is discussed in application Ser. No. 09/376,237 (FNC-0014), which is incorporated herein by reference.

In addition to ADM equipment, it is expected that optical cross connect systems (OCCS) will be commercially deployed for establishment of transmission paths, reconfiguration and restoration across the network. This equipment will provide essentially similar functions to digital cross connect systems (DCS) currently deployed in the SONET network but again providing functionality at the optical level. The OCCS will in general provide wavelength switching (wavelength conversion) and/or space switching of signals between fibers. It is expected that commercial OCCS will initially operate via O/E and E/O conversion offering a means to regenerate the signal at the same time as establishing a wavelength conversion. Future equipment is expected however to operate completely in the optical domain using devices such as semiconductor optical amplifier (SOA) wavelength converters: One highly attractive feature of these devices lies in the means to provide wavelength conversion over a range of wavelengths from a single device.

Although true all-optical switching provides many advantages over switching schemes using electrical regeneration, it will still be necessary to provide the full 3R (regeneration, reshaping & retiming) functionality throughout the network. Optical amplifiers will be widely deployed to boost optical signals. But these devices do not overcome transmission impairments, such as chromatic and polarization mode dispersion, that limit the unregenerated transmission distance. In addition, optical amplifiers contribute optical spontaneous emission noise to the signal which eventually leads to errors in the detection of signals.

Although an all-optical network may be designed to accommodate these impairments it would be costly and cumbersome in terms of the specifications of the transmission medium, optical amplifiers and optical processing devices. Arbitrary scaling of such a network would also be difficult if at all possible. It is thus clear that a regeneration function which preserves the wavelength identity of individual channels will be desirable. All-optical 3R regeneration is unlikely to find near term deployment due to the common requirement for return-to-zero (RZ) pulse processing and complex active optical components.

In one aspect, the present invention relates to a component, namely a regenerator, that can be used in an all-optical switched network. In other aspects, the invention relates to systems and networks that may include the regenerator. The regenerator will be discussed first.

To provide viable optical network functionality, the preferred embodiment of the present invention provides a wavelength preserving regenerator function operating in the electrical domain. This device will take an arbitrary wavelength input signal, e.g., from the ITU specified wavelength grid, regenerate the signal and provide an output at the same wavelength. The device may be expected to be included in OCCS and OADM equipment and also as a standalone function in the transmission path enabling arbitrary length optically amplified transmission spans.

FIG. 1 shows a schematic example of a first embodiment Wavelength Preserving Regenerator 10 that accomplishes the goals described above. In this figure, an optical signal that includes a multiplex of wavelengths is applied incident to demultiplexing filter 12. The filter 12 is selected to pass light of a particular wavelength while eliminating the signals at other wavelengths. In the preferred embodiment, this component comprises a thin film dielectric filter. Alternatively, filter 12 may be an interferometric type filter such as an arrayed waveguide grating (AWG) or a Fabry-Perot type filter.

The signal at the selected wavelength is then applied to optical-to-electrical (O/E) element 14 where it can be converted into the electrical domain. In the preferred embodiment, the O/E element 14 comprises a photodetector such as a semiconductor material photodetector. An optical preamplifier may or may not be included before the O/E function.

The 3R processing is undertaken with a clock extract element 16 (typically a phased locked loop or PLL circuit ) and a D-type flip/flop circuit 18. Using known techniques, clock extract element 16 determines the frequency of the recovered signal and generates a clock signal at that frequency. This clock signal can then be applied to the clock input of the D-type flip/flop 18. The output of the D-type flip/flop 18 will be a digital pulse that has been regenerated in amplitude, reshaped and retimed.

The regenerated electrical signal is then converted to an optical signal by electrical-to-optical (E/O) element 20. In the preferred embodiment, E/O element 20 comprises a semiconductor laser, typically a distributed feedback grating (DFG) type laser. The output of E/O element 20 is an optical signal of the same wavelength as the original. In this embodiment, the matching of input and output wavelengths is accomplished by using matched filter 12 and laser within E/O element 20. In other words, in this example, the output wavelength is selected to match the wavelength of selection filter 12. An optical post amplifier may or may not be used after the E/O function to boost the power level of the output signal.

In this example, simple functionality is shown with no detection of the content of the signal. The clock signal is extracted from the signal and may be configured to operate over a narrow range or potentially a wide range. It may be attractive to provide for detection of the content of the signal, for example to detect SONET or other optical channel overhead information. To accomplish this additional goal, circuitry (not shown) would be included between D-type flip/flop 18 and E/O element 20. This circuitry could read and even alter the information contained in the transmitted signals.

After electrical-to-optical conversion, wavelength multiplexing is typically performed using conventional techniques. This multiplexing will provide a WDM aggregate signal.

The embodiment of FIG. 1 serves at least two important functions, namely, the wavelength multiplexing/ demultiplexing function and the regenerating function. One feature of this embodiment is that the regenerator 10 is wavelength preserving, that is the wavelength of the optical signal going out is the same as the wavelength of the optical signal going in. In this example, the system is hardwired to see that the wavelengths match.

Figure 2:
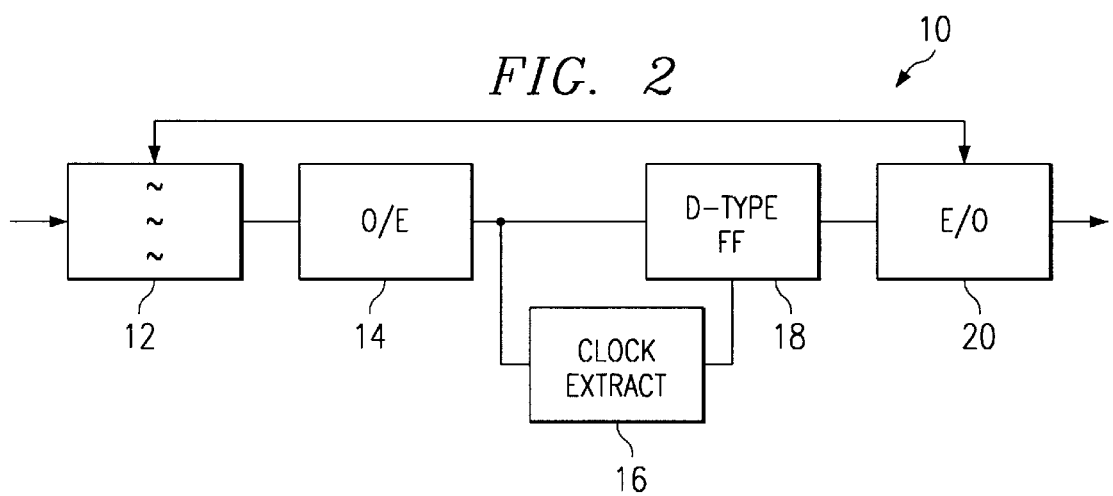
FIG. 2 is a second embodiment optical regenerator.
Figure 3:
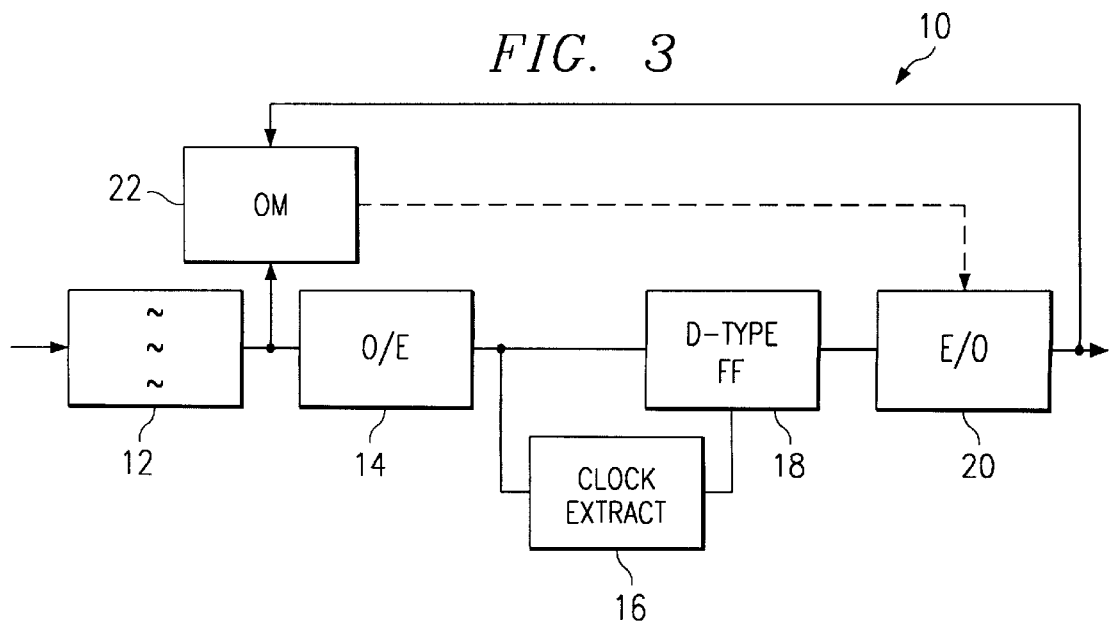
FIG. 3 is a third embodiment optical regenerator.

In other examples, the goal of matching the wavelength at the output with the wavelength at the input can be accomplished in other ways. Two such circuits are shown in FIGS. 2 and 3. Each of these embodiment circuits utilize a tunable laser in conjunction with either fixed or tunable wavelength selection filters.

Figure 4:
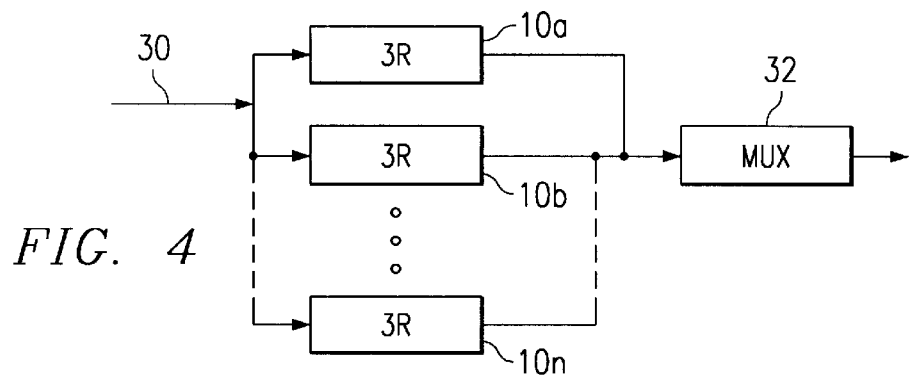
FIGS. 4–6 are optical systems that can utilize any of the regenerators of FIGS. 1–3.

Referring first to FIG. 2, filter 12 and E/O element 20 comprise tunable components. Each of these components can be tuned to match the specific application. In other words, a typical system, e.g., as illustrated in FIG. 4, will have signals with different wavelengths traveling over a fiber 30. Each of the regenerators 10a–10n will include a filter 12 and an E/O element 20 that are tuned to one of the wavelengths. In this manner, each channel can be separated from the aggregate signal. In another embodiment, one of the components (e.g., filter 12) is fixed while the other component (e.g., E/O element 20) is tunable.

Figure 5:
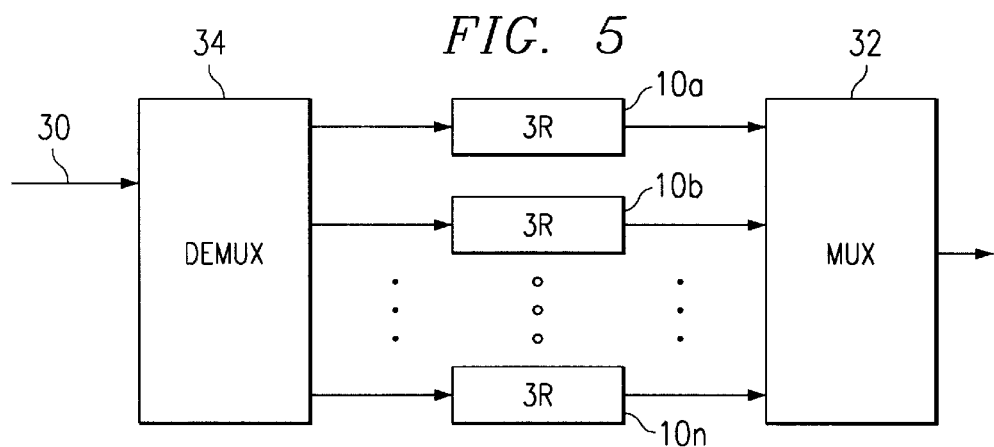

Likewise, regeneration circuit 10 can be used in a system as illustrated in FIG. 5. In this case, a demultiplexing circuit 34 takes the aggregate input signal from fiber 30 and separates each of the channels onto its own link. Each channel is then input to one of the regeneration circuits 10a–10n. In this example, the filter 12 has been pulled out of the regeneration circuit 10 and included in demultiplexing circuit 34.

Filter 12 may be one of a number of components for isolation of a single wavelength. Many such devices are commercially available including thin film dielectric or other interferometric types. Such devices and technology are well known to those of ordinary skill in the art. It is noted that filter 12 may comprise a single filtering devices or more than one filtering devices coupled in series.

E/O element 20 is typically a laser/light modulator combination. These devices are widely available commercially. Similarly, the regeneration circuit that includes elements 16 and 18 can be purchased as a standalone circuit, typically including a clock extraction circuit and a D-type flip-flop.

An advantage of the system of FIG. 2 is that a single component will work with a number of different channels. This feature lowers overall costs since fewer component types need to be manufactured and inventories can be more easily controlled. In one embodiment, each regenerator is useful for four or more channels. In the preferred embodiment, it is expected that each regenerator will be useful over a wide range of wavelengths (e.g., 40, 80 or even greater number of wavelengths). As the technology develops, it is envisioned that commercially available components would be tunable over much larger wavelength ranges, possibly over the entire relevant spectrum.

Figure 6:
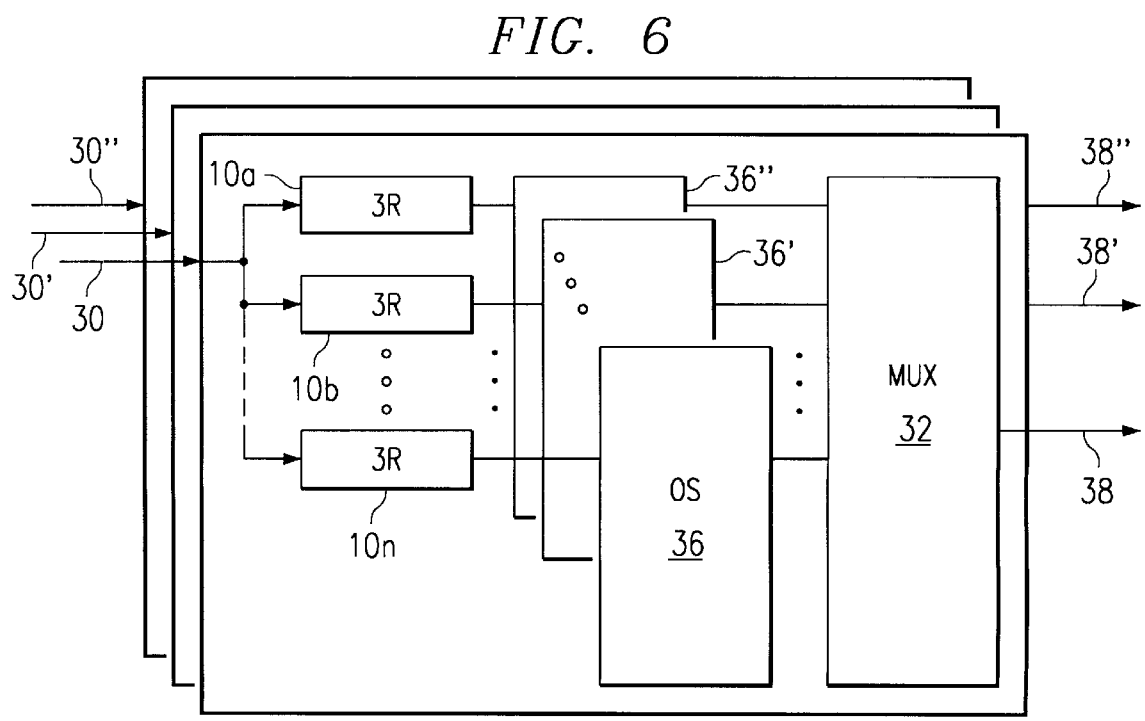

A system, such as the one illustrated in any of FIGS. 4–6, can utilize a number of substantially identical optical regenerators. In this context, two optical regenerators are substantially identical when either can be tuned to operate over in the same range of wavelengths. For example, regenerator 10a is substantially identical to regenerator 10b if they can be exchanged in the system so that regenerator 10a is now regenerating the optical signal at the wavelength previously regenerated by regenerator 10b, and vice versa.

In some systems, each of the substantially identical regenerators may operate over the entire spectrum of wavelengths. This situation is ideal since only one type of regenerator is needed. The regenerator could then be tuned to the proper wavelength and installed in the system. In other systems, however, the spectrum will include more wavelengths than can be tuned by any one regenerator type. In this case, the system may utilize a number of groups of regenerators. For example, a first type of regenerator can be used for a first set of wavelengths and a second type of regenerator for a second set of wavelengths. In one particular case, as an example, a system that includes 160 channels may use four different types of regenerators, each type of regenerator being tunable over forty different wavelengths. Many other permutations are also possible.

FIG. 3 illustrates another embodiment regeneration circuit 10. In particular, this embodiment utilizes a technique to lock the operating wavelength of the tunable laser (part of E/O 20) with the wavelength generated by filter 12. In this example, an optical monitor 22 receives optical signals from the filter 12 and the E/O element 20. The wavelengths of these optical signals are compared and a control signal is provided to the E/O element 20. The control signal, e.g., an intermediate frequency (IF) signal, will instruct the E/O element to adjust the output wavelength until it matches (or is otherwise correlated) with the wavelength from filter 12. Filter 12 can be either a fixed or a tunable filter.

In the preferred embodiment, optical monitor 20 is an optical mixer that is used to provide a control signal for tuning the output laser wavelength based on the difference in wavelength between the input and generated wavelengths. When the difference frequency is zero then the control signal to tune the wavelength of the output laser wavelength may be null.

The regenerator 10 of FIG. 3 can also be utilized in the in-line system of either FIG. 4 or 5. If used with the system of FIG. 5, for example, the regenerator can simply be placed in the system and allowed to calibrate (assuming the wavelengths are close enough to be locked together). This feature provides a great advantage for assembly and maintenance.

Another example of an application for the regenerator 10 is shown in FIG. 6. Any of the embodiment regenerators described herein could be used with this application.

Referring now to FIG. 6, an example optical cross connect system (OCCS) configuration is shown. In this example, three different fibers 30, 30' and 30" are fed into the OCCS. Each fiber is coupled to a plurality of regenerators 10a–10n as in the systems of FIGS. 4 and 5. The output of the regenerators 10a–10n is coupled to an optical switch fabric 36. The optical switch fabric 36 is designed so that traffic can be switched across wavelengths and across fibers. In other words, the optical switch fabric can perform space switching, i.e., couple a signal from one fiber to another, and wavelength switching, i.e., convert a signal at a first wavelength to a signal at a second wavelength. The signals are then combined to form a wavelength aggregate or a plurality of output fibers.

In another embodiment, the wavelength switching can be done in the regenerator 10. For example, the E/O element 20 can be tuned to a wavelength that is different than the wavelength of the input signal. In one example, E/O element 20 is tuned via a control signal that is derived by a system manager (not shown). Other embodiments are also possible.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A wavelength preserving optical regenerator comprising:
   an optical-to-electrical conversion unit with an input to receive an optical signal at a first wavelength;
   a retiming and regeneration circuit with an input coupled to an output of the optical-to-electrical conversion unit;
   an electrical-to-optical conversion unit with an input coupled to an output of the retiming and regeneration circuit, the electrical-to-optical conversion unit operable to receive an electrical signal and generate an optical signal based on the electrical signal, the electrical-to-optical conversion unit including a tunable laser that can be tuned so that the wavelength of the optical signal generated by the electrical-to-optical conversion unit has a fixed relationship with the first wavelength; and
   an optical monitor including a first optical input coupled to the input of the optical-to-electrical conversion unit and a second optical input coupled to an output of the electrical-to-optical conversion unit, the optical monitor further comprising a control output coupled to the electrical-to-optical conversion unit such that a signal output from the control output can be used to tune the wavelength of the optical signal generated by the electrical-to-optical conversion unit.

2. The regenerator of claim 1 and further comprising an optical filter with an output coupled to the input of the optical-to-electrical conversion unit.

3. The regenerator of claim 2 wherein the optical filter comprises a tunable optical filter.

4. The regenerator of claim 2 wherein the tunable optical filter and the tunable laser are both tuned to the first wavelength.

5. The regenerator of claim 1 wherein the tunable laser is tuned so that the wavelength of the optical signal generated by the electrical-to-optical conversion unit is equal to the first wavelength.

6. The regenerator of claim 1 wherein the retiming and regeneration circuit comprises a D-type flip/flop and clock extracting circuit with an output coupled to a clock input of the D-type flip/flop.

7. The regenerator of claim 1 wherein the optical-to-electrical conversion unit comprises a semiconductor photodetector.

8. The regenerator of claim 1 wherein the tunable laser can be tuned to over a range of wavelengths so the tunable laser can generate optical signals at any one of forty or more different wavelengths.

9. The regenerator of claim 1 and further comprising an optical filter with an output coupled to the input of the optical-to-electrical conversion unit.

10. The regenerator of claim 9, wherein the optical filter comprises a tunable optical filter.

11. A method of regenerating a digital optical signal, the method comprising:
   providing a regenerator that includes a tunable light source;
   tuning the light source to a first wavelength;
   receiving an optical signal at the first wavelength;
   converting the optical signal into an electrical signal;
   regenerating the electrical signal;
   converting the regenerated electrical signal to an optical signal at the first wavelength, the optical signal being generated by the tunable light source;
   comparing the optical signal received at the first wavelength and the optical signal being generated by the tunable light source; and
   generating a control signal based on the comparison, the control signal controlling the tuning of the light source to the first wavelength.

12. The method of claim 11 and further comprising:
   receiving a light wave; and
   filtering the light wave to provide the optical signal at the first wavelength.

13. The method of claim 12 and further comprising tuning a filter to the first wavelength prior to receiving the light wave, the filter filtering the light wave to provide the optical signal at the first wavelength.

14. The method of claim 11 wherein the step of tuning the light source is performed prior to receiving an optical signal at the first wavelength.

15. The method of claim 11 wherein the light source is tuned based on the optical signal received at the first wavelength.

16. The method of claim 11 wherein the regenerating the electrical signal includes retiming the electrical signal.

17. An optical system comprising:
   a plurality of substantially identical, tunable, wavelength-preserving, optical regenerators, each of the regenerators tuned to a different wavelength such that when the regenerator is tuned to a given wavelength the regenerator will generate a regenerated, reshaped and retimed optical signal at that given wavelength;
   a multiplexer coupled to receive and combine regenerated optical signals from each of the regenerators; and
   an optical switch fabric coupled between the regenerators and the multiplexer.

18. The system of claim 17 wherein each of the optical regenerators includes a tunable optical wavelength filter.

19. The system of claim 17 and further comprising a plurality of optical wavelength filters, each filter associated with a respective one of the plurality of optical regenerators.

20. The system of claim 19 wherein each of the optical wavelength filters comprises a tunable filter.

21. The system of claim 18 wherein each of the optical regenerators comprises:
   an optical-to-electrical conversion unit with an input to receive an optical signal at the given wavelength;
   a retiming and regeneration circuit with an input coupled to an output of the optical-to-electrical conversion unit; and
   an electrical-to-optical conversion unit with an input coupled to an output of the retiming and regeneration circuit, the electrical-to-optical conversion unit operable to receive an electrical signal and generate an optical signal based on the electrical signal, the electrical-to-optical conversion unit including a tunable laser that is tuned so that the wavelength of the optical signal generated by the electrical-to-optical conversion unit is the same as the given wavelength.

22. The system of claim 17 and further comprising a second plurality of substantially identical, tunable, wavelength-preserving, optical regenerators, the second plurality of optical regenerators being different that the first plurality of optical regenerators.

23. An optical system comprising:
   a plurality of substantially identical, tunable, wavelength-preserving optical regenerators, each of the regenerators tuned to a different wavelength such that when the regenerator is tuned to a given wavelength, the regenerator will generate a regenerated, reshaped and retimed optical signal at that given wavelength, wherein each of the optical regenerators comprises:

an optical-to-electrical conversion unit with an input to receive an optical signal at the given wavelength;

a retiming and regeneration circuit with an input coupled to an output of the optical-to-electrical conversion unit;

an electrical-to-optical conversion unit with an input coupled to an output of the retiming and regeneration circuit, the electrical-to-optical conversion unit operable to receive an electrical signal and generate an optical signal based on the electrical signal, the electrical-to-optical conversion unit including a tunable laser that is tuned so that the wavelength of the optical signal generated by the electrical-to-optical conversion unit is the same as the given wavelength; and an optical monitor including a first optical input coupled to the input of the optical-to-electrical conversion unit and a second optical input coupled to an output of the electrical-to-optical conversion unit, the optical monitor further comprising a control output coupled to the electrical-to-optical conversion unit such that a signal output from the control output can be used to tune the wavelength of the optical signal generated by the electrical-to-optical conversion unit; and a multiplexer coupled to receive and combine regenerated optical signals from each of the regenerators.

24. The system of claim 23 wherein each of the optical regenerators further comprises a tunable optical filter with an output coupled to the input of the optical-to-electrical conversion unit.

* * * * *

UNITED STATES PATENT AND TRADEMARK OFFICE
CERTIFICATE OF CORRECTION

PATENT NO.    : 6,476,953 B1
DATED         : November 5, 2002
INVENTOR(S)   : Paul R. Morkel It is certified that error appears in the above-identified patent and that said Letters Patent is hereby corrected as shown below:

Title page,
Item [56], References Cited, U.S. PATENT DOCUMENTS, delete "5,777,766" and insert -- 5,777,765 --.
FOREIGN PATENT DOCUMENTS, delete "EP0732786A1" and insert -- EP0732768A1 --.

Signed and Sealed this

Twenty-fifth Day of November, 2003

JAMES E. ROGAN
*Director of the United States Patent and Trademark Office*